A. G. W. FOSTER.
Cotton Planter.
No. 108,580.
Patented Oct. 25, 1870.
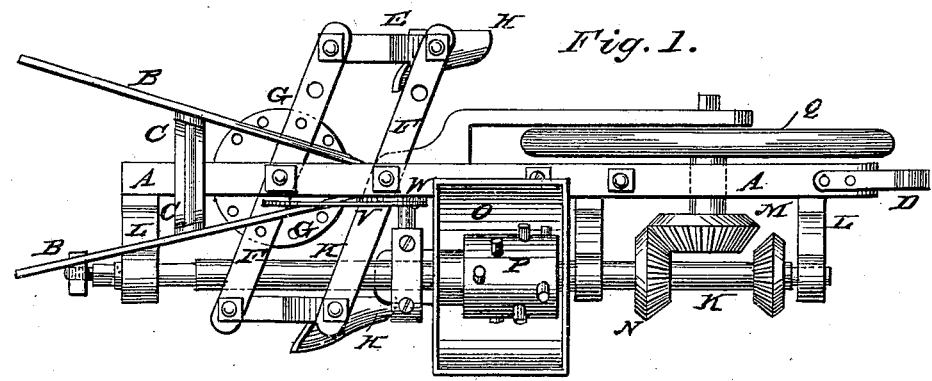
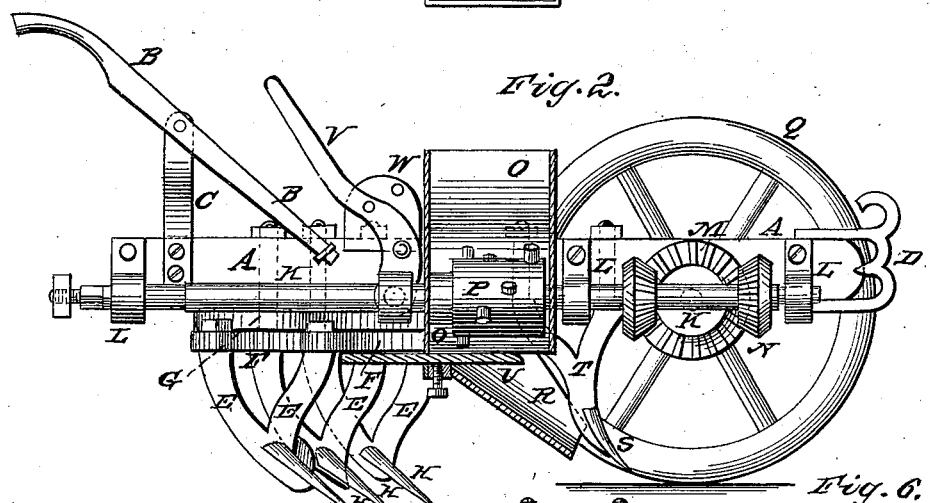
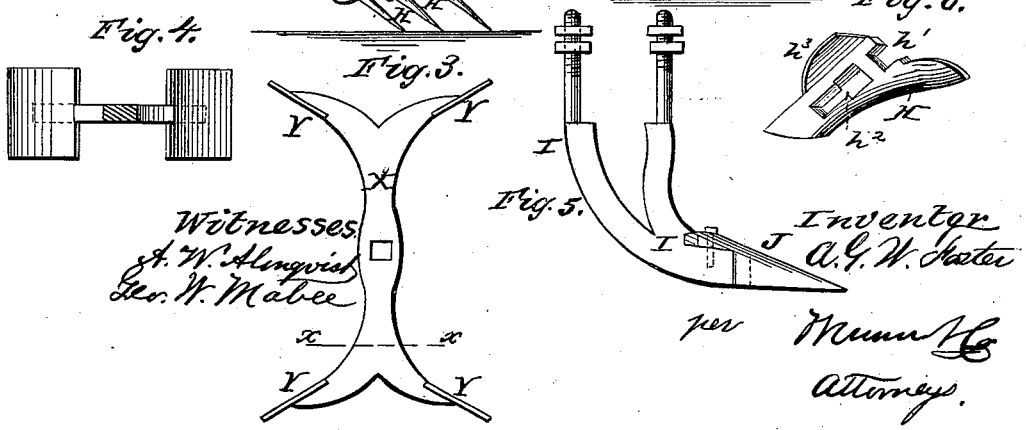

United States Patent Office.

ABRAHAM G. W. FOSTER, OF FRANKLIN, GEORGIA.

Letters Patent No. 108,580, dated October 25, 1870.

IMPROVEMENT IN COTTON-PLANTERS.

The Schedule referred to in these Letters Patent and making part of the same.

*To all whom it may concern:*

Be it known that I, ABRAHAM G. W. FOSTER, of Franklin, in the county of Heard and State of Georgia, have invented a new and useful improved Cotton-Planter; and I do hereby declare that the following is a full, clear, and exact description thereof, which will enable others skilled in the art to make and use the same, reference being had to the accompanying drawing forming part of this specification, in which—

Figure 1 is a top view of my improved machine.

Figure 2 is a side view of the same.

Figure 3 is a detail side view of the subsoil plow and standard.

Figure 4 is a detail perspective view of one of the plows.

Similar letters of reference indicate corresponding parts.

My invention relates to improvements in machines for planting cotton or other seeds, and consists in the combination and construction of parts, as hereinafter described, and as specified in the claim.

A is the beam, to the rear part of which are attached the forward ends of the handles B, the rear parts of which are supported and held in their proper relative position by the brace C.

To the forward end of the beam A is attached a clevis, D, to which the draft is attached.

E are the plow-standards, the upper ends of which are made forked, as shown in figs. 1 and 2.

The upper ends of the branches of the standards E pass through holes in the two cross-bars F, where they are secured in place by nuts, as shown in figs. 1 and 2.

The branches of the central standard pass up through the centers of the bars F, and through holes in the beam A.

By this construction, by setting the bars F at a greater or lesser angle with the line of draft, the plows will be adjusted closer together or farther apart, as may be required.

When planting cotton, the plows will be reversed and adjusted the requisite distance apart, so as to throw the earth inward, and cover the seed dropped in the furrow opened by the plow S.

G is a wheel or circle, rigidly attached to the under side of the beam A, along the under side of which the cross-bars F pass, and to which the rear cross-bar is secured by pins or bolts passing through holes in the said bar, and through one or the other of the circle of holes formed through the said circle G.

H are the plows, the upper edges of which have notches, $h'$, formed in them, to receive a shoulder formed upon the lower part of the plow-standards E.

In the body of the plows H are formed slots $h^2$, the upper ends of which are made large, to receive the dovetailed head or catch formed upon or attached to the lower part of the plow-seat, and which, when the plow is slipped up to its place, enters the dovetailed lower part of this said slot, where it is secured in place by a bolt passing through the enlarged upper part of said slot, so that the plow cannot work down.

To one side of the plows H may be attached, or upon it may be formed, a cutter, $h^3$, as shown in Figure 6.

I have shown, in Figure 5, plows J, provided with standards I, which may be used for subsoiling by detaching the plows H and standards E. These plows (J) I do not, however, desire to claim in this application, but refer to them merely as parts which may be advantageously used in connection with my plow.

K is a shaft, extending along the side of the beam A, and working in bearings in the arms or brackets L, attached to the said beam.

M is a large bevel-gear wheel, pivoted at the side of the forward part of the beam A to a short shaft, which passes through the beam A, and to the other end of which is attached the drive-wheel Q, which rolls along the surface of the ground, and, by its revolution, gives motion to the shaft K through the gear-wheels M N.

To the forward part of the shaft K are attached two small bevel-gear wheels N, at such a distance apart that, when either of them is in gear with the gear-wheel M, the other may revolve without touching the said wheel M.

The shaft K passes through the seed-hopper O, and to it, within said hopper, is attached a cylinder, P, to which are attached two or more spiral rows of teeth, which, as the shaft K is revolved, stir up the seed in the hopper O, and cause it to pass out through the discharge opening in the forward part of the bottom of said hopper into the discharge-spout R, by which it is conducted to the ground just in the rear of the furrowing-plow S, the standard T of which is attached to the beam A, a little in front of the hopper O.

The size of the discharge-opening in the bottom of the hopper O is adjusted according to the size of the seed to be planted, or the character of the guano or other fertilizer to be distributed, by means of the slide U, as shown in fig. 2.

The shaft K is moved longitudinally to throw one or the other of the bevel-gear wheels N into gear with the gear-wheel M by the lever V, which is pivoted to the beam A, and the lower end of which is connected with the shaft K.

This change is effected to adjust the cylinder P in the hopper O, so as to stir the seed or fertilizing material just over the delivery opening or at a point slightly removed from it. Thus, the teeth of the cylinder will break up any lumps which impede the steady exit of such seed and fertilizing material. It may also be adjusted so as not to revolve at all.

To the lever V is attached a pin, which enters holes in a catch-bar or plate, W, attached to the beam A, to hold the said lever securely in any position into which it may be adjusted.

Upon the rear end of the shaft K is formed a square tenon, which adapts it to form a suitable connection with a rotary chopper. Any form of chopper may be employed, and thus the machine temporarily adapted to operate as a cotton-chopper.

Having thus described my invention,

I claim as new and desire to secure by Letters Patent—

1. The cross and connecting-bars F F, the circular and perforated plate G, and bifurcated standards E E, all constructed and arranged as shown and described.

2. The plows H, made with a notch, $h^1$, at their upper end, and a slot, $h^2$, made larger at its upper end, and dovetailed at its lower end, to adapt them for convenient attachment to the standards E, substantially as herein shown and described, and for the purpose set forth.

ABRAHAM G. W. FOSTER.

Witnesses:
C. R. WATTS,
C. W. BOYD.